(12) United States Patent
Daniski et al.

(10) Patent No.: US 10,753,356 B2
(45) Date of Patent: Aug. 25, 2020

(54) ADAPTIVE FLOW CONTROL (71) Applicant: Graco Minnesota Inc., Minneapolis, MN (US)

(72) Inventors: Joseph A. Daniski, Minnetonka, MN (US); Theodore J. Stone, St. Louis Park, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 346 days.

(21) Appl. No.: 15/140,734

(22) Filed: Apr. 28, 2016

(65) Prior Publication Data
US 2016/0319811 A1 Nov. 3, 2016

Related U.S. Application Data (60) Provisional application No. 62/155,587, filed on May 1, 2015.

(51) Int. Cl.
*F04B 49/20* (2006.01)
*F04B 17/03* (2006.01)
*F04B 49/06* (2006.01)

(52) U.S. Cl.
CPC .............. *F04B 49/20* (2013.01); *F04B 17/03* (2013.01); *F04B 49/06* (2013.01); *F04B 2203/0209* (2013.01); *F04B 2203/0213* (2013.01); *F04B 2205/09* (2013.01)

(58) Field of Classification Search
CPC .......... F04B 49/20; F04B 23/00; F04B 17/03; F04B 19/20; F04B 19/22; F04B 49/06; F04B 49/065; F04B 49/10; F04B 49/106; F04B 49/12; F04B 2203/02;
(Continued)

(56) References Cited

U.S. PATENT DOCUMENTS 4,850,805 A \* 7/1989 Madsen ................ A61M 5/172
222/63
5,461,270 A 10/1995 Didier
5,509,788 A 4/1996 Livingston et al.
(Continued)

OTHER PUBLICATIONS

International Preliminary Report on Patentability for PCT Patent Application No. PCT/US2016/029688, dated Nov. 16, 2017, 14 pages.
(Continued)

*Primary Examiner* — Patrick Hamo
*Assistant Examiner* — Chirag Jariwala
(74) *Attorney, Agent, or Firm* — Kinney & Lange, P.A.

(57) ABSTRACT

A system includes a fixed-displacement fluid pump, a motor operatively connected to the fixed-displacement fluid pump, a sensor configured to sense a parameter related to a drive speed of the motor, and a user interface. The pump controller is configured to receive an input from the user interface of a target flow rate of the pump, determine a duty cycle for the motor based on the target flow rate, and control the motor to operate according to the duty cycle. The pump controller is further configured to receive an indication of the sensed parameter related to the drive speed of the motor, determine a measured drive speed of the motor based on the sensed parameter, and iteratively adjust the duty cycle based on a difference between the measured drive speed of the motor and an expected drive speed of the motor.

18 Claims, 2 Drawing Sheets

(58) Field of Classification Search
CPC ...... F04B 2203/0209; F04B 2203/0213; F04B 2205/09
USPC ..... 417/18, 20, 22, 44.1, 45, 44.11, 43, 300; 318/599
See application file for complete search history.

(56) References Cited

U.S. PATENT DOCUMENTS

| | | | |
|---|---|---|---|
| 7,543,596 B2 | 6/2009 | Laverdiere et al. | |
| 7,603,186 B2 | 10/2009 | Smirnov | |
| 7,765,881 B2 | 8/2010 | Miller et al. | |
| 7,897,327 B2 * | 3/2011 | Millis | A01N 1/02 417/19 |
| 8,082,946 B2 | 12/2011 | Laverdiere et al. | |
| 8,430,120 B2 | 4/2013 | Laverdiere et al. | |
| 8,464,837 B2 | 6/2013 | Algulin et al. | |
| 8,635,939 B2 | 1/2014 | Linjama et al. | |
| 8,690,820 B2 | 4/2014 | Cinar et al. | |
| 8,939,428 B2 | 1/2015 | Laverdiere et al. | |
| 2003/0041903 A1 | 3/2003 | Chang et al. | |
| 2005/0047922 A1 * | 3/2005 | Brown | F23L 17/005 417/22 |
| 2006/0053865 A1 | 3/2006 | Bristol | |
| 2014/0210321 A1 | 7/2014 | Dixon et al. | |
| 2014/0356212 A1 | 12/2014 | Barth et al. | |
| 2015/0240801 A1 | 8/2015 | Marioni | |

OTHER PUBLICATIONS

Written Opinion & International Search Report, for PCT Application No. PCT/US2016/029688, dated Aug. 4, 2016, 17 pages.
Examiner's Report for Australian Patent Application No. 2016257653, dated Aug. 9, 2019, 5 pages.

* cited by examiner

ADAPTIVE FLOW CONTROL

CROSS-REFERENCE TO RELATED APPLICATION

This application claims priority to U.S. Provisional Application No. 62/155,587 filed on May 1, 2015, and entitled "ADAPTIVE FLOW CONTROL METHOD," the entire contents of which are hereby incorporated by reference in their entirety.

BACKGROUND

Many commercial and industrial systems require accurate and precise delivery of fluid throughout or at various stages of a controlled process. Often, such systems utilize a pump controller device that manages operation of a pump to deliver the required amount of fluid. To obtain the required accuracy of fluid delivery, the pump controller typically receives process feedback data in the form of measured process parameters obtained from various sensors disposed throughout the system. Such sensors can provide feedback information to the pump controller, such as flow rate and/or volume output from the pump, temperature, pressure, and/or viscosity of the fluid at various stages of the process, or other measured feedback parameters that enable the pump controller to vary the pump activation times or output rate to achieve real-time control of fluid delivery. The addition of multiple feedback sensors, however, results in increased complexity of design and process control implementation, as well as increased costs associated with component costs and corresponding system maintenance.

SUMMARY

In one example, a system includes a fixed-displacement fluid pump, a motor operatively connected to the fixed-displacement fluid pump, a sensor configured to sense a parameter related to a drive speed of the motor, a user interface, and a pump controller operatively connected to the motor, the sensor, and the user interface. The pump controller is configured to receive an input from the user interface of a target flow rate of the fixed-displacement fluid pump, determine a duty cycle for the motor based on the target flow rate, and control the motor to operate according to the duty cycle. The pump controller is further configured to receive, from the sensor, an indication of the sensed parameter related to the drive speed of the motor, determine a measured drive speed of the motor based on the received indication of the sensed parameter, and iteratively adjust the duty cycle based on a difference between the measured drive speed of the motor and an expected drive speed of the motor.

In another example, a method includes the steps of: (a) driving a motor operatively connected to a fixed-displacement fluid pump to operate according to a duty cycle; (b) sensing a parameter related to a drive speed of the motor; (c) determining a measured drive speed of the motor based on the sensed parameter; (d) adjusting the duty cycle based on a difference between the measured drive speed of the motor and an expected drive speed of the motor; and (e) repeating steps (a) through (d).

In another example, a pump controller includes one or more processors and computer-readable memory. The computer-readable memory is encoded with instructions that, when executed by the one or more processors, cause the pump controller to: (a) drive a motor operatively connected to a fixed-displacement fluid pump to operate according to a duty cycle; (b) receive, from a sensing device, an indication of a sensed parameter related to a drive speed of the motor; (c) determine a measured drive speed of the motor based on the sensed parameter; (d) adjust the duty cycle based on a difference between the measured drive speed of the motor and an expected drive speed of the motor; and (e) repeat steps (a) through (d).

DETAILED DESCRIPTION

According to techniques of this disclosure, a pump controller can determine and adjust a duty cycle for a motor that is operatively connected to a fixed-displacement fluid pump to achieve a target flow rate of the pump. Rather than require feedback measurements of flow rate, temperature, pressure, or other direct measurements of the fluid or pump output, a pump controller implementing techniques described herein can adjust the motor duty cycle based on a measured drive speed of the motor using, e.g., a reed switch or other low-cost and low-overhead sensing device. The measured drive speed of the motor can effectively provide operational feedback that includes the effects of load on the motor due to system pressure, fluid temperature and/or viscosity, drive power voltage, or other factors that can affect the achieved output of the pump. As such, techniques of this disclosure can provide a cost-effective solution for adaptive control of a fluid pump, thereby helping to decrease the cost of implementation and maintenance of the system.

Figure 1:
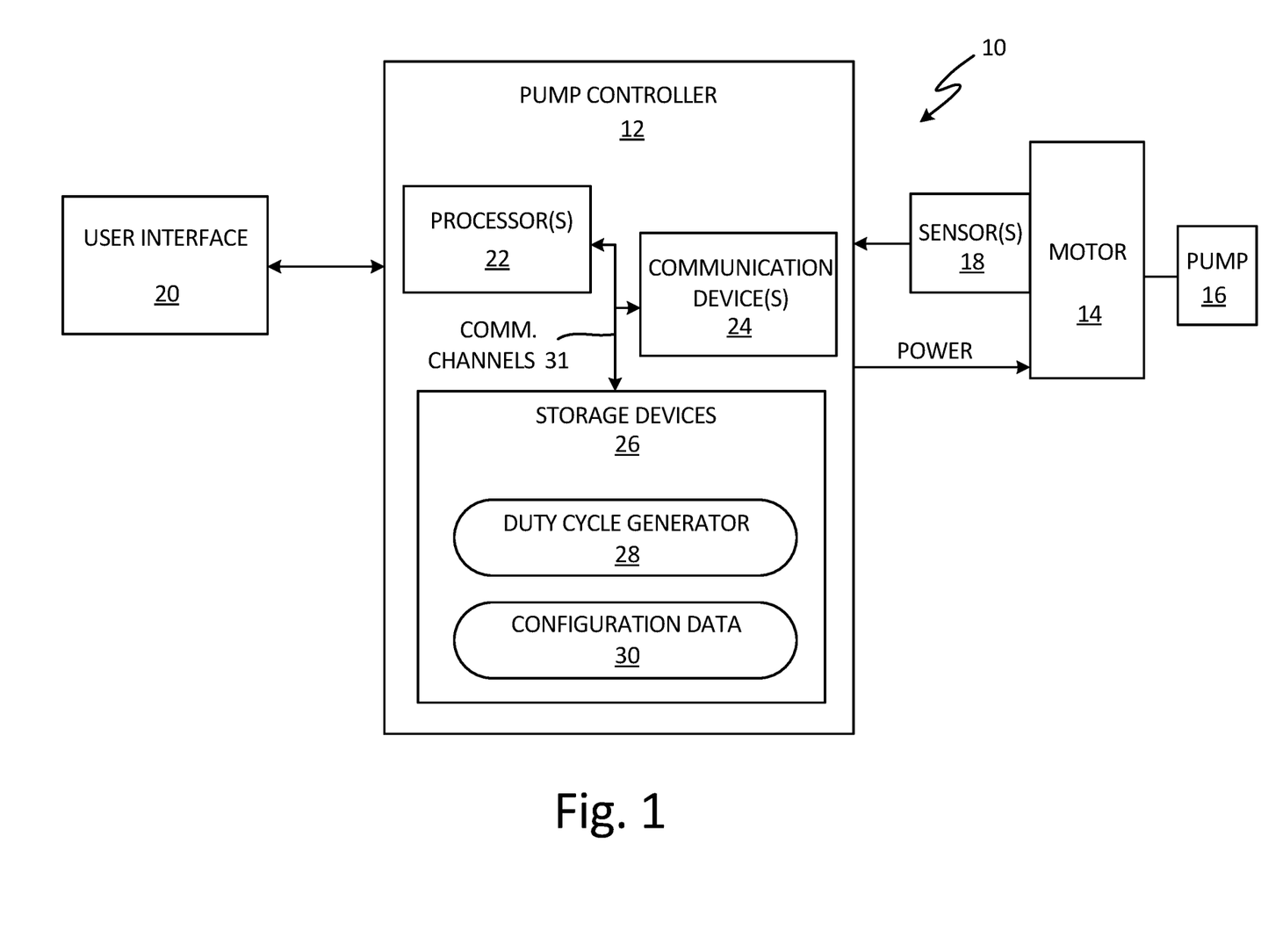
FIG. 1 is a schematic block diagram of an example system including a pump controller that can adjust a duty cycle for a motor that is operatively connected to a fixed-displacement fluid pump based on a measured drive speed of the motor.

FIG. 1 is a schematic block diagram of system 10 including pump controller 12 that adjusts a duty cycle for motor 14 that is operatively connected to pump 16 based on a measured drive speed of motor 14. As illustrated in FIG. 1, system 10 further includes one or more sensors 18 and user interface 20. Pump controller 12 includes one or more processors 22, one or more communication devices 24, and one or more storage devices 26. Storage device(s) 26 includes duty cycle generator 28 and configuration data 30.

Pump 16 is a reciprocating, rotary, or other type of fluid pump that is configured to draw fluid (including slurries of mixed fluid and solid material) from an inlet of the pump and discharge the fluid through an outlet of the pump. In some examples, pump 16 is a fixed-displacement pump, meaning that an output volume of pump 16 per pump cycle (e.g., reciprocation of a piston or other actuation of a reciprocating fluid pump, or rotation of a rotary fluid pump) is invariant. For instance, pump 16 can be a one-way or two-way reciprocating fluid pump that includes a piston (not illustrated), the reciprocating action of which draws fluid into a pump chamber through an inlet and discharges the fluid through an outlet of pump 16. The reciprocating action of the piston can discharge a fixed (i.e., invariant) amount of fluid through the outlet of pump 16 for a given displacement of the piston. As such, a known displacement of the reciprocating piston can correlate to a known volume of fluid output from pump 16.

Motor 14 can be any motor that mechanically actuates pump 16 to operate pump 16 to actively draw fluid through the pump inlet and discharge the fluid through the pump outlet. For instance, motor 14 can be a direct current (DC) or alternating current (AC) electric motor that converts electrical energy into linear or rotary force (e.g., torque). In some examples, motor 14 can be a fixed-rate motor that is configured to operate at an expected rate when supplied with a baseline voltage or current. For instance, motor 14 can be a fixed-rate motor that is configured to rotate at an expected rate, such as sixty rotations per minute (60 RPM) or other expected rates, when supplied with a baseline voltage, such as twelve volts or other baseline voltage or current. In other examples, motor 14 can be a variable-rate motor that is configured to rotate at a rate that is based on (e.g., proportional to) a voltage supplied to motor 14.

Sensor(s) 18 include any one or more sensing devices that can sense operational parameters of motor 14, a mechanical interface between motor 14 and pump 16, and/or pump 16. For example, sensor(s) 18 can include a rotational position (e.g., rotary encoder) and/or rotational rate sensor configured to sense a rotational position and/or rotational rate of motor 14, a shaft, gear, cam, or other component of a mechanical interface between motor 14 and pump 16, or component of pump 16. In some examples, sensor(s) 18 includes a reed switch that senses the presence (i.e., proximity) of a magnet disposed on a moving component of motor 14, the mechanical interface between motor 14 and pump 16, or pump 16, such as a rotating or reciprocating shaft of motor 14, a gear or cam included in a mechanical interface between motor 14 and pump 16, or other moving component. In certain examples, sensor(s) 18 can include a linear position and/or rate sensor disposed on, e.g., a displacement piston or other linear actuating component of pump 16. While the example of FIG. 1 schematically illustrates sensor(s) 18 adjacent motor 14, it should be understood that sensor(s) 18 can be disposed at any location of system 10 such that sensor(s) 18 can sense operational parameters of motor 14, a mechanical interface between motor 14 and pump 16, and/or pump 16. For instance, in some examples, sensor(s) 18 can be mounted directly to pump 16.

User interface 20 can be any graphical and/or mechanical interface that enables user interaction with pump controller 12 and/or other components of system 10. For example, user interface 20 can include a display device that outputs a graphical user interface for presenting information to and/or receiving input from a user. User interface 20 can include graphical navigation and control elements, such as graphical buttons, a graphical keyboard (e.g., a "soft keyboard"), or other graphical control elements presented at e.g., a touch-sensitive display device integral to or operatively coupled to user interface 20. User interface 20, in some examples, can include physical navigation and control elements, such as physically-actuated buttons, keyboard, or other physical navigation and control elements. In general, user interface 20 can include any input and/or output devices and control elements that can enable user interaction with pump controller 12 and/or other components of system 10.

Pump controller 12 can be any electronic device including processing circuitry and computer-readable memory configured to control operation of motor 14 according to techniques described herein. For instance, pump controller 12 can be remote from or integral to pump 16 and/or motor 14, and can control operation of motor 14 to adaptively control operation of motor 14 based on measured sensor data received from sensor(s) 18 and input received from user interface 20, as is further described below.

Pump controller 12, as illustrated in FIG. 1 includes processor(s) 22, communication device(s) 24, and storage device(s) 26. Storage device(s) 26 includes duty cycle generator 28 and configuration data 30. Duty cycle generator 28 can include computer-readable instructions that, when executed by processor(s) 22, cause pump controller 12 to determine and adapt a duty cycle for motor 14 defining a percentage of a cycle period during which an active control signal is supplied to motor 14, as is further described below. The portion of the cycle period during which the control signal (e.g., drive voltage) is active (e.g., high) can be considered the on-time duration for the cycle period. The portion of the cycle period during which the control signal is inactive (e.g., low) can be considered the off-time duration for the cycle period. The aggregate (i.e., sum) of the on-time duration and the off-time duration is the cycle period.

Configuration data 30 can store information corresponding to operational parameters of system 10. For example, configuration data 30 can store data identifying a fluid volume output of pump 16 per unit of displacement of pump 16 (e.g., volume output per unit of displacement of a reciprocating piston that drives fluid output of pump 16), a correlation between a rotational or linear displacement of a component of motor 14 or mechanical interface between motor 14 and pump 16 and displacement of pump 16, an expected drive speed of motor 14, a baseline voltage related to the expected drive speed of motor 14, or other data corresponding to operational parameters of system 10. In some examples, configuration data 30 can store, e.g., a fluid volume output of pump 16 per unit of displacement of pump 16 that is configured via user interface 20.

As illustrated in FIG. 1, motor 14 is operatively connected to pump 16 to control operation of pump 16. For example, motor 14 can be physically connected to pump 16 via one or more mechanical interfaces, such as shafts, gears, cams, or other mechanical interfaces to control operation of pump 16 via actuation of motor 14. Sensor(s) 18 are operatively connected to motor 14, the mechanical interface between motor 14 and pump 16, and/or pump 16 (e.g., a pump displacement rod) to sense one or more parameters related to a drive speed of motor 14. For instance, sensor(s) 18 can be physically proximate or integral to one or more of motor 14, pump 16, or a component included in a mechanical interface between motor 14 and pump 16. In one example, sensor(s) 18 includes a reed switch disposed proximate a cam included in a mechanical interface between motor 14 and pump 16 that converts rotation of a drive shaft of motor 14 into linear motion that drives a reciprocating piston of pump 16. In such an example, the reed switch can sense proximity of one or more magnets disposed on the cam to sense rotational position of the cam during operation of motor 14.

As further illustrated in FIG. 1, pump controller 12 is operatively connected to sensor(s) 18 and motor 14. Pump controller 12 can be electrically coupled to motor 14 to command operation of motor 14 according to, e.g., a duty cycle that defines a percentage of a cycle period in which an active control signal (e.g., a drive voltage) is supplied to motor 14 to cause motor 14 to actuate pump 16 to actively discharge fluid. For instance, pump controller 12 can apply electrical power to motor 14 to drive motor 14 for an on-time duration defined by the duty cycle for a cycle period (e.g., one minute). In some examples, pump controller 12 can include or otherwise be operatively connected to, e.g., a relay or other electrical switching device that controls the routing of electrical power to motor 14. For instance, electrical power can be supplied by an external power source that is routed through a relay controlled by pump controller 12 to supply electrical power to motor 14 and remote the electrical power from motor 14. Pump controller 12 can be electrically and/or communicatively coupled to sensor(s) 18 to receive measured sensor data from sensor(s) 18, such as measured sensor data of one or more parameters relating to a drive speed of motor 14 (e.g., a frequency of rotation of a drive shaft of motor 14, a frequency of rotation of a gear, cam, or other rotating component of a mechanical interface between motor 14 and pump 16, or other parameters relating to a drive speed of motor 14).

Pump controller 12 is further connected to user interface 20 to send and receive information to user interface 20 to enable user interaction with pump controller 12 and/or other components of system 10. User interface 20 can be integral to or remote from user interface 20. For example, user interface 20 can include a display device and graphical and/or physical control elements that are integral to pump controller 12 to enable user interaction with pump controller 12 via user interface 20. In other examples, user interface 20 can be part of a remote device, such as a laptop computer, tablet computer, desktop computer, cellular telephone (e.g., smartphone), or other remote device implementing user interface 20 and communicatively coupled with pump controller 12 via one or more wired or wireless networks, or both.

In operation, pump controller 12 receives an indication of a target flow rate for pump 16 from, e.g., user interface 20. Pump controller 12 controls operation of motor 14 to achieve the target flow rate, such as by determining and adjusting a duty cycle for motor 14 that defines a percentage of a cycle period during which an active control signal, such as a drive voltage, is supplied to motor 14 to cause motor 14 to actuate pump 16 to actively discharge fluid. For example, duty cycle generator 28 can receive an indication of a target flow rate for pump 16 from user interface 20, such as a target flow rate of five gallons of fluid output per day. Duty cycle generator 28 can access configuration data 30 storing output data of pump 16 defining a fluid volume output of pump 16 per unit of displacement of pump 16 (e.g., linear displacement of a reciprocating piston that causes pump 16 to discharge fluid) and a correlation between a drive speed of motor 14 and displacement of pump 16. Duty cycle generator 28 can determine a duty cycle for motor 14 to achieve the target flow rate of pump 16 based on the output data of pump 16 and the correlation between the drive speed of motor 14 and the displacement of pump 16. The correlation between the drive speed of motor 14 and the displacement of pump 16, in some examples, can be stored in a lookup table or can be in the form of a stored formula or algorithm. As one example, duty cycle generator 28 can determine a 10% duty cycle for motor 14 based on an expected drive speed of 60 RPM of motor 14, the 10% duty cycle defining an on-time duration of 6 seconds and a corresponding off-time duration of 54 seconds for a given cycle period of one minute to achieve the target flow rate of 5 gallons of fluid output per day.

Duty cycle generator 28 can receive a sensed parameter related to a measured drive speed of motor 14 from sensor(s) 18, such as a sensed parameter of a number of rotations per minute of a drive shaft or other component of a mechanical interface between motor 14 and pump 16 via, e.g., a reed switch sensor device, and can determine the measured drive speed of motor 14 based on the sensed parameter. Duty cycle generator 28 can adjust the duty cycle for motor 14 to achieve the target flow rate (e.g., 5 gallons per day) based on a difference between the measured drive speed of motor 14 and the expected drive speed of motor 14. For instance, duty cycle generator 28 can increase the duty cycle (thereby increasing the on-time duration for the cycle period) in response to determining that the measured drive speed of motor 14 is less than the expected drive speed, and can decrease the duty cycle (thereby decreasing the on-time duration for the duty cycle period) in response to determining that the measured device speed of motor 14 is greater than the expected drive speed of motor 14. Accordingly, duty cycle generator 28 can adjust an active duty cycle to adaptively control operation of motor 14 to achieve a target flow rate based on a measured drive speed of motor 14.

The measured drive speed of motor 14 can provide feedback to pump controller 12 for control of motor 14 that effectively incorporates the effects of a load on motor 14 due to, e.g., system pressure, fluid temperature and/or viscosity, drive power voltage for motor 14, or other factors that can affect the drive speed of motor 14 (and hence operational output of pump 16). That is, an increased load on motor 14 can result in a measured drive speed of motor 14 that is less than the expected drive speed of motor 14. Such increased load can be due to, e.g., a decrease in temperature (and resulting increase in viscosity) of the fluid, an increased system pressure, or other such factors. A decrease in a drive power voltage for motor 14 as compared with a baseline drive voltage can also result in a measured drive speed of motor 14 that is less than the expected drive speed of motor 14. Conversely, a decreased load on motor 14 due to, e.g., an increased temperature (and resulting decrease in viscosity) of the fluid, a decreased system pressure, or other such factors, can result in a measured drive speed of motor 14 that is greater than the expected drive of motor 14. By controlling the operational duty cycle of motor 14 based on the measured (i.e., achieved) drive speed of motor 14, pump controller 12 can control operation of motor 14 to achieve the target flow rate while compensating for environmental or other factors that can affect the actual output rate of pump 16. Rather than require direct measurement of each of the factors that can affect the output rate of pump 16 (or even the direct measurement of the actual flow rate of fluid output from pump 16), techniques described herein can enable pump controller 12 to adaptively control operation of motor 14 based on a measured drive speed of motor 14 that can be determined based on a low-cost and low-overhead sensing device, such as a reed switch. In this way, the techniques can enable pump controller 12 to adaptively control motor 14 to achieve a target flow rate of pump 16 without requiring potentially expensive system components, such as flow meters, temperature sensors, pressure sensors, viscosity sensors, or other such sensor devices.

As illustrated in FIG. 1, pump controller 12 includes processor(s) 22, communication device(s) 24, and storage device(s) 26. Processor(s) 22, in one example, are configured to implement functionality and/or process instructions for execution within pump controller 12. For instance, processor(s) 22 can be capable of processing instructions stored in storage device(s) 26. Examples of processor(s) 22 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 26 can be configured to store information within pump controller 12 during operation. Storage device(s) 26, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 26 are a temporary memory, meaning that a primary purpose of storage device(s) 26 is not long-term storage. Storage device(s) 26, in some examples, are described as volatile memory, meaning that storage device(s) 26 do not maintain stored contents when power to pump controller 12 is turned off. Examples of volatile memories can include random access memories (RAM), dynamic random access memories (DRAM), static random access memories (SRAM), and other forms of volatile memories. In some examples, storage device(s) 26 are used to store program instructions for execution by processor(s) 22. Storage device(s) 26, in one example, are used by software or applications running on pump controller 12 (e.g., a software program implementing functionality attributed herein to duty cycle generator 28) to temporarily store information during program execution.

Storage device(s) 26, in some examples, also include one or more computer-readable storage media. Storage device(s) 26 can be configured to store larger amounts of information than volatile memory. Storage device(s) 26 can further be configured for long-term storage of information. In some examples, storage device(s) 26 include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Pump controller 12, in some examples, also includes communications device(s) 24. Pump controller 12, in one example, utilizes communication device(s) 24 to communicate with external devices via one or more networks, such as one or more wired or wireless networks or both. Communications device(s) 24, in some examples, can include discrete and/or analog circuitry configured to send and receive data according to a defined communication protocol. In certain examples, communications device(s) 24 can be a network interface card, such as an Ethernet card, an optical transceiver, a radio frequency transceiver, or any other type of device that can send and receive information. Other examples of such network interfaces can include Bluetooth, 3G, 4G, and WiFi radio communication devices, as well as Universal Serial Bus (USB).

Each of processor(s) 12, communication device(s) 24, and storage device(s) 26 can be interconnected (physically, communicatively, and/or operatively) for inter-component communications. For instance, as illustrated in FIG. 1, processor(s) 12, communication device(s) 24, and storage device(s) 26 can be coupled by one or more communication channels 31. In some examples, communication channel(s) 31 can include a system bus, a network connection, an inter-process communication data structure, or any other structure or method for communicating data.

Figure 2:
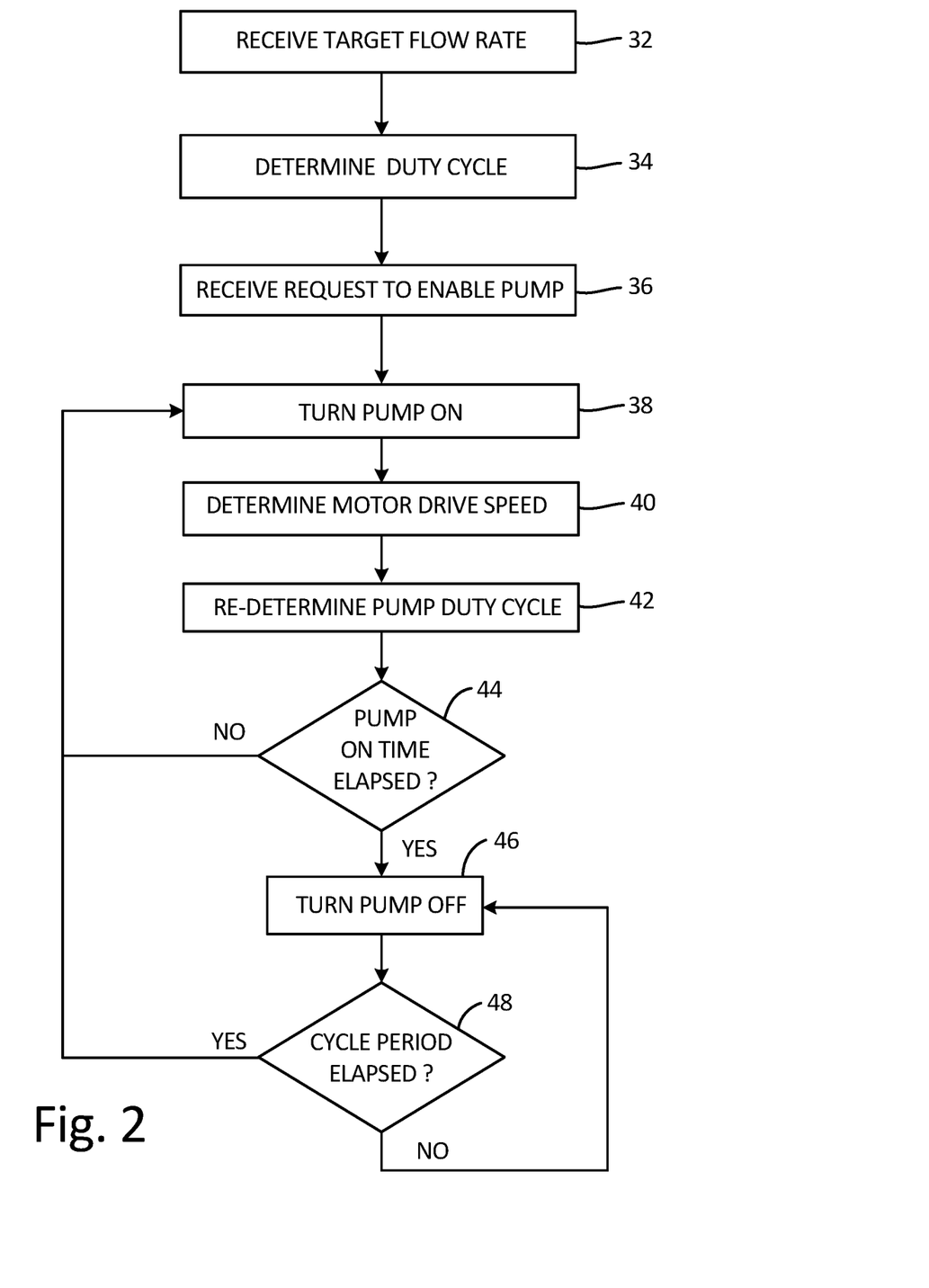
FIG. 2 is a flow diagram illustrating example operations to iteratively adjust a duty cycle for a motor that is operatively connected to a fixed-displacement fluid pump based on a measured drive speed of the motor.

FIG. 2 is a flow diagram illustrating example operations to adaptively determine a duty cycle for a motor that is operatively connected to a fixed-displacement fluid pump based on a measured drive speed of the motor. For purposes of clarity and ease of discussion, the example operations are described below in the context of system 10 of FIG. 1.

An indication of a target flow rate for a fixed-displacement fluid pump can be received (Step 32). For example, duty cycle generator 28 can receive an indication of a target flow rate for pump 16 (e.g., a fixed-displacement fluid pump) from user interface 20. A duty cycle for a motor operatively connected to the fluid pump can be determined (Step 34). For instance, duty cycle generator 28 can determine a duty cycle for motor 14 that defines a percentage of a cycle period during which an active control signal is supplied to motor 14 to cause motor 14 to actuate pump 16 to actively discharge fluid. The cycle period, in some examples, can be a fixed (e.g., defined) time period, such as a time period of 30 seconds, 1 minute, 5 minutes, 10 minutes, or other duty cycle time periods.

Duty cycle generator 28 can determine the duty cycle based on a correlation between a drive speed of motor 14 and a volumetric output of pump 16 stored in, e.g., configuration data 30. For instance, duty cycle generator 28 can access configuration data 30 to determine a correlation between a volumetric output of pump 16 and a drive speed of motor 14, and can determine the duty cycle for a defined cycle period based on the correlation to achieve the target flow rate.

Duty cycle generator 28 can receive an indication of a request to enable the pump (Step 36). For example, duty cycle generator 28 can receive an input from user interface 20 commanding pump controller 12 to begin operation of motor 14 to cause pump 16 to actively discharge fluid.

The motor can be operated according to the determined duty cycle (Step 38). For example, pump controller 12 can apply electrical power to motor 14 to drive motor 14 to actively discharge fluid during the on-time duration of the cycle period. A measured drive speed of the motor can be determined (Step 40). For instance, duty cycle generator 28 can receive a sensed parameter from sensor(s) 18 related to a drive speed of motor 14. The sensed parameter can be, e.g., a series of actuations from a reed switch that senses proximity of a magnet disposed on a moving component of motor 14 or a mechanical interface between motor 14 and pump 16, such as a drive shaft of motor 14, a gear, a cam or other component of a mechanical interface between motor 14 and pump 16. Duty cycle generator 28 can determine the measured drive speed of motor 14 based on the sensed parameter related to the drive speed of motor 14. For instance, duty cycle generator 28 can access configuration data 30 that stores a correlation between the rotational period of the sensed parameter and the drive speed of motor 14.

The duty cycle for the motor can be adjusted (Step 42). For example, duty cycle generator 28 can adjust the duty cycle for motor 14 based on a difference between the measured drive speed of motor 14 and an expected drive speed of motor 14. For instance, duty cycle generator 28 can access configuration data 30 storing an expected drive speed of motor 14 at which motor 14 is configured to operate when supplied with a baseline voltage, such as an expected drive speed of 60 RPM when supplied with a baseline voltage of 12 volts. Duty cycle generator 28 can compare the measured drive speed of motor 14 to the expected drive speed to determine a difference between the measured drive speed and the expected drive speed. Duty cycle generator 28 can adjust the duty cycle for motor 14 defining an adjusted percentage of the cycle period during which the active control signal is supplied to motor 14 to cause motor 14 to actuate pump 16 to actively discharge fluid. The cycle period can remain unchanged. In certain examples, duty cycle generator 28 can adjust the duty cycle by determining an on-time duration adjustment value based on the difference between the measured drive speed of motor 14 and the expected drive speed of motor 14 and adjusting the on-time duration of the duty cycle by adding the on-time duration adjustment value and the on-time duration of the duty cycle. Accordingly, duty cycle generator 28 can adjust a duty cycle for control of motor 14 to increase an on-time duration of motor 14 for the cycle period in response to a measured drive speed of motor 14 that is less than the expected drive speed of motor 14, and to decrease the on-time duration of motor 14 for the cycle period in response to a measured drive speed of motor 14 that is greater than the expected drive speed of motor 14.

It can be determined whether the on-time duration of the cycle period has elapsed (44). For example, duty cycle generator 28 can operate motor 14 according to the adjusted duty cycle by applying electrical power to motor 14 to drive motor 14 to actively discharge fluid during the on-time duration defined by the adjusted duty cycle. Duty cycle generator 28 can include a timer or other equivalent functionality to determine an elapsed time during which motor 14 is commanded to actuate pump 16 to actively discharge fluid (e.g., an elapsed time during which motor 14 is supplied with electrical power to drive motor 14) and an elapsed time during which motor 14 is not commanded to actuate pump 16 to actively discharge fluid (e.g., an elapsed time during which motor 14 is not supplied with electrical power to drive motor 14).

In response to determining that the on-time duration of the duty cycle has not elapsed ("NO" branch of Step 44), duty cycle generator 28 can continue to supply electrical power to motor 14 to cause motor 14 to actuate pump 16 to actively discharge fluid (Step 38). As such, duty cycle generator 28 can iteratively adjust the duty cycle for control of motor 14 by determining the measured drive speed of motor 14 (Step 40), re-determining (i.e., adjusting) the duty cycle for control of motor 14 (Step 42), and operating motor 14 by applying electrical power to drive motor 14 according to the adjusted duty cycle. Although the example of FIG. 2 illustrates an adjustment of the duty cycle for each iteration of Steps 38, 40, and 42, and 44, in some examples, duty cycle generator 28 may not adjust the duty cycle for control of motor 14 (i.e., corresponding to Step 42) during each iteration. For instance, in certain examples, duty cycle generator 28 may adjust the duty cycle for control of motor 14 every second, third, fourth, or other numbers of iterations. In some examples, duty cycle generator 28 can adjust the duty cycle for control of motor 14 based on an average of a threshold number of measured drive speeds, such as an average of ten or other numbers of measured drive speeds.

In response to determining that the on-time duration of the duty cycle has elapsed ("YES" branch of Step 44), electrical power to the motor can be withdrawn to cause the pump to refrain from actively discharging fluid (Step 46). For instance, duty cycle generator 28 can cease to apply electrical power to motor 14 during the off-time duration of the duty cycle, thereby causing pump 16 to refrain from actively discharging fluid during the off-time duration. In this way, duty cycle generator 28 can operate motor 14 according to the duty cycle by applying electrical power to drive motor 14 only during the on-time duration of the duty cycle.

It can be determined whether the cycle period has elapsed (Step 48). For example, duty cycle generator 28 can compare the total elapsed time of the cycle (i.e., the sum of the on-time period and the elapsed portion of the off-time period) to the cycle period (e.g., thirty seconds, one minute, or other cycle periods) to determine whether the cycle period has elapsed. In response to determining that the cycle period has not elapsed ("NO" branch of Step 48), duty cycle generator 28 can continue to refrain from applying electrical power to motor 14. In response to determining that the cycle period has elapsed ("YES" branch of Step 48), duty cycle generator 28 can supply electrical power to motor 14 to cause motor 14 to actuate pump 16 to actively discharge fluid (i.e., during the on-time duration of the duty cycle). While the example operations are illustrated in FIG. 2 as re-determining (i.e., adjusting) the duty cycle for control of motor 14 (Step 42) during the on-time duration of the duty cycle, in other examples, the on-time duration of the duty cycle can be adjusted during the off-time duration of the duty cycle. For instance, duty cycle generator 28 can re-determine the on-time duration of the duty cycle while power to motor 14 is not supplied based on the measured drive speed of motor 14 determined while power to motor 14 is supplied during the on-time duration.

Accordingly, techniques of this disclosure can enable pump controller 12 to determine and adjust a duty cycle to adaptively control motor 14 to achieve a target flow rate of pump 16. Rather than require feedback measurements of flow rate, temperature, pressure, or other direct measurements of the fluid or pump output, pump controller 12 can adjust the motor duty cycle based on a measured drive speed of the motor using, e.g., a reed switch or other low-cost and low-overhead sensing device. As such, techniques described herein can enable cost-effective adaptive control of a fluid pump, thereby helping to decrease the overall cost of implementation, operation, and maintenance of the system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a fixed-displacement fluid pump;
   a motor operatively connected to the fixed-displacement fluid pump;
   a sensor configured to sense a parameter related to a rotational period of a component driven by the motor;
   a user interface; and
   a pump controller operatively connected to the motor, the sensor, and the user interface, the pump controller configured to:
   receive an input from the user interface of a target flow rate of the fixed-displacement fluid pump;
   determine a duty cycle for the motor based on the target flow rate by determining a defined on-time duration and a defined off-time duration of the motor for a defined cycle period that is equal to an aggregate of the defined on-time duration and the defined off-time duration;
   control the motor to operate according to the duty cycle;
   receive, from the sensor, an indication of the sensed parameter related to the rotational period of the component driven by the motor;
   determine a measured drive speed of the motor based on the received indication of the sensed parameter related to the rotational period of the component driven by the motor; and iteratively adjust the duty cycle based on a difference between the measured drive speed of the motor and an expected drive speed of the motor.

2. The system of claim 1,
wherein the pump controller is configured to iteratively adjust the duty cycle for the motor by at least being configured to:
determine an on-time duration adjustment value based on the difference between the measured drive speed of the motor and the expected drive speed of the motor; and
iteratively adjust the duty cycle by adding the on-time duration adjustment value to the defined on-time duration of the duty cycle.

3. The system of claim 1,
wherein the pump controller is configured to determine the measured drive speed of the motor based on the received indication of the sensed parameter related to the rotational period of the component driven by the motor by at least being configured to determine the measured drive speed of the motor during the defined on-time duration of the duty cycle.

4. The system of claim 1,
wherein the sensor comprises a reed switch.

5. The system of claim 1,
wherein the pump controller is configured to determine the duty cycle based on a pump flow rate of the fixed-displacement fluid pump and the target flow rate.

6. The system of claim 1,
wherein the pump controller is configured to iteratively adjust the duty cycle by at least being configured to adjust the defined on-time duration of the duty cycle for the defined cycle period.

7. The system of claim 1,
wherein the motor comprises a fixed-rate motor configured to operate at the expected drive speed of the motor.

8. A method comprising the steps of:
(a) determining a duty cycle for a motor operatively connected to a fixed-displacement fluid pump by determining a defined on-time duration and a defined off-time duration of the motor for a defined cycle period that is equal to an aggregate of the defined on-time duration and the defined off-time duration;
(b) driving the motor to operate according to the duty cycle;
(c) sensing a parameter related to a rotational period of a component driven by the motor;
(d) determining a measured drive speed of the motor based on the sensed parameter related to the rotational period of the component driven by the motor;
(e) adjusting the duty cycle based on a difference between the measured drive speed of the motor and an expected drive speed of the motor; and
(f) repeating steps (b) through (e).

9. The method of claim 8,
wherein sensing the parameter related to the rotational period of the component driven by the motor comprises sensing a period between reed switch actuations of the component.

10. The method of claim 8,
wherein adjusting the duty cycle comprises:
determining an on-time duration adjustment value based on the difference between the measured drive speed of the motor and the expected drive speed of the motor; and
adjusting the duty cycle by adding the on-time duration adjustment value to the defined on-time duration of the duty cycle.

11. The method of claim 8,
wherein adjusting the duty cycle comprises adjusting the defined on-time duration of the duty cycle for the defined cycle period.

12. The method of claim 8,
wherein the motor comprises a fixed-rate motor configured to operate at the expected drive speed of the motor.

13. The method of claim 8,
wherein the duty cycle is based on a pump flow rate of the fixed-displacement fluid pump and a target flow rate.

14. The method of claim 13, further comprising:
receiving an indication of the target flow rate from a user interface.

15. A pump controller comprising:
one or more processors; and
computer-readable memory encoded with instructions that, when executed by the one or more processors, cause the pump controller to:
(a) determine a duty cycle for a motor operatively connected to a fixed-displacement fluid pump by determining a defined on-time duration and a defined off-time duration of the motor for a defined cycle period that is equal to an aggregate of the defined on-time duration and the defined off-time duration;
(b) drive the motor to operate according to the duty cycle;
(c) receive, from a sensing device, an indication of a parameter related to a rotational period of a component driven by the motor;
(d) determine a measured drive speed of the motor based on the sensed parameter related to the rotational period of the component driven by the motor;
(e) adjust the duty cycle based on a difference between the measured drive speed of the motor and an expected drive speed of the motor; and
(f) repeat steps (b) through (e).

16. The pump controller of claim 15,
wherein the computer-readable memory is further encoded with instructions that, when executed by the one or more processors, cause the pump controller to adjust the duty cycle by at least causing the pump controller to adjust the defined on-time duration of the duty cycle for the defined cycle period.

17. The pump controller of claim 15,
wherein the computer-readable memory is further encoded with instructions that, when executed by the one or more processors, cause the pump controller to determine the duty cycle for the motor by at least causing the pump controller to determine the duty cycle based on a pump rate of the fixed-displacement fluid pump and a target flow rate.

18. The pump controller of claim 15,
wherein the computer-readable memory is further encoded with instructions that, when executed by the one or more processors, cause the pump controller to adjust the duty cycle by at least causing the pump controller to:
determine an on-time duration adjustment value based on the difference between the measured drive speed of the motor and the expected drive speed of the motor; and adjust the duty cycle by adding the on-time duration adjustment value to the defined on-time duration of the duty cycle.

\* \* \* \* \*